A. G. GLASGOW.
MANUFACTURE OF CARBURETED WATER GAS.
APPLICATION FILED JULY 15, 1912.
1,047,512.
Patented Dec. 17, 1912.
2 SHEETS—SHEET 1.
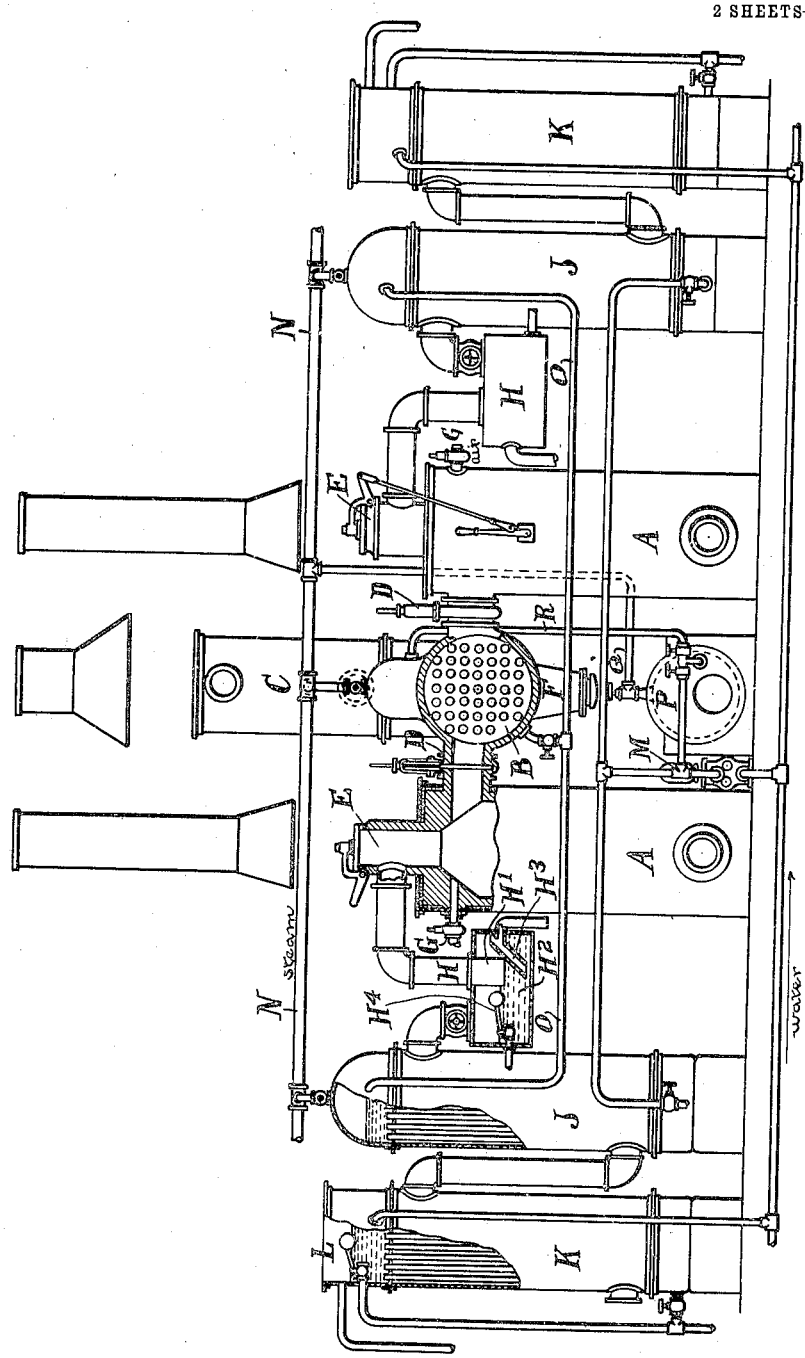
WITNESSES
INVENTOR
BY
ATTORNEY

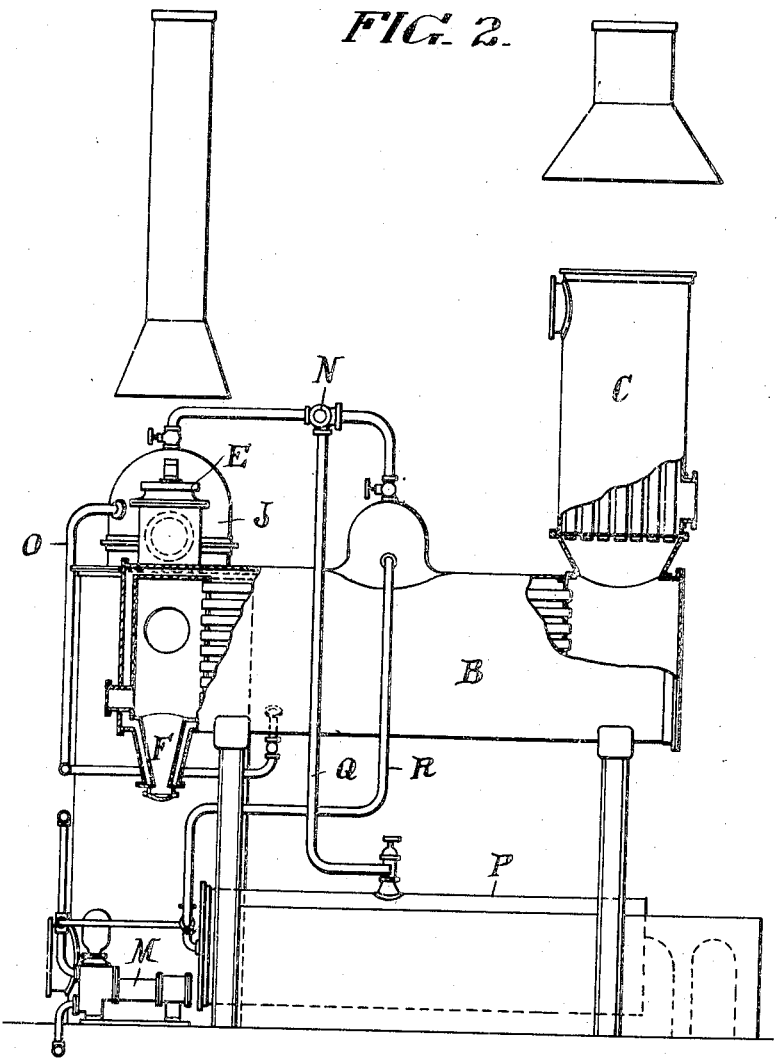

UNITED STATES PATENT OFFICE.

ARTHUR G GLASGOW, OF RICHMOND, VIRGINIA.

MANUFACTURE OF CARBURETED WATER-GAS.

1,047,512.

Specification of Letters Patent. Patented Dec. 17, 1912.

Original application filed November 20, 1908, Serial No. 463,576. Divided and this application filed July 15, 1912. Serial No. 709,331.

*To all whom it may concern:*

Be it known that I, ARTHUR G. GLASGOW, a citizen of the United States of America, residing in Richmond, county of Henrico, and State of Virginia, temporarily a resident of Westminster, county of London, England, have invented a certain new and useful Improvement in the Manufacture of Carbureted Water-Gas, of which the following is a true and exact description, reference being had to the accompanying drawings, which form a part thereof.

My present invention relates especially to the manufacture of carbureted water gas by the Lowe process and has for one of its objects to provide a novel and effective method of cooling the newly made gas and freeing it from carbonaceous impurities, and at the same time efficiently utilizing the heat abstracted from the gas.

A further object of the invention is to provide a practical and effective method of utilizing the sensible heat contained in the gaseous blast products in conjunction with the heat abstracted from the newly made gas in the generation of steam which may be employed for any desirable purpose as in the manufacture of the water gas, thus entirely or largely avoiding the use of independent boiler fuel.

In treating the newly made gas in accordance with the present invention, I first free the gas of carbonaceous impurities which would deposit on or clog up the gas cooling flues by forcing the heated gas into contact with water in such manner that the water collects a large proportion of such impurities into a tarry fluid that settles and outflows automatically, while the water is largely converted into steam, which passes from the cleaning chamber mixed with and superheated by the partially cleaned gas at a temperature materially in excess of 212° F. I supply the cleansing water in sufficient amount to compensate for the water converted into steam, and if need be, sufficiently in excess of the amount evaporated to purge out the tarry impurities collected from the gas by the water; but I do not rely on the flow of water as water out of the cleansing chamber as a means for obtaining any sensible abstraction of heat from the gas. From the cleansing chamber I pass the gas and steam admixture through a gas cooling and water heating system wherein the gas and steam mixed therewith are cooled and the latter condensed and wherein the heat given off by the gas and steam is utilized in raising the temperature of the cooling water to a degree substantially higher than 212° F.

The exact character of the water cleaner or washer for the gas which I may use is not an essential element of the invention, broadly considered. Such a seal will perform the necessary function of preventing the blast products from passing out of the gas generating apparatus into the apparatus for treating the newly made gas; and I have ascertained during careful study of a great number of carbureted water gas plants which I have built that such a washer seal may be so designed that when interposed between the fixing chamber or "superheater" and the gas condenser, it will be effective in preventing any troublesome deposit upon the condenser tubes through or around which the gas passes for its further cooling treatment, and will thus maintain such condenser tubes approximately in their original effective condition. To make such a seal effective as a cleaner, it must be arranged so that the gas will impinge against the water without blowing it out of the containing chamber. When the gas impinges against the water the latter serves as a sort of liquid baffle to which the impurities carried into contact with the water first adhere, so to speak, and in which they eventually settle. I have also ascertained that the hydraulic seal in such a washer can be maintained in a safe and effective condition without passing the usual continuous stream of water through the washer by using tar-overflow and automatic water-inlet devices which maintain the seal at a practically constant depth, allowing the tar (and any purging water) to overflow during the "run," while supplying during the "blow" sufficient fresh water to take the place of the water that is evaporated and carried forward as steam or vapor by the hot gas passing through the seal. When the steam carried forward from this washer-seal is recondensed with the gas in the usual water-cooled surface gas-condenser, the large quantity of heat previously absorbed from the gas in the evaporation of the washer-water into said steam is liberated. This would require a corresponding increase in the quantity of water which it would be necessary to pass through said surface condenser at atmospheric pressure in order to reduce the outlet gas to the normal temperature. But with my invention, on account of the relatively high temperature at which the gas and steam enter the condensing apparatus, I have found that I may confine the condensing water under pressure in a properly proportioned boiler or condenser and while regulating the volume of the condensing water to reduce the outlet gas to its normal temperature, may bring the outlet water to a temperature much in excess of the maximum of 212° F. otherwise possible, and indeed may convert some or all of this water into steam at a pressure materially above that of the atmosphere.

When the newly made gas is cleaned and treated in the manner above described, I have ascertained that the usual "scrubber" (or jet condenser), wherein the gas is scrubbed and churned to intimate contact with the cooling water, may be dispensed with. In my new system, the abolition of this scrubber leads to far-reaching advantages: It avoids drastic treatment of the oil gases and vapors; it obviates the formation of the emulsion of tar and water, which occurs when the scrubber is used and which requires such comprehensive and careful separation before the tar is fit for use and the water again fit for re-circulation or to be run to waste; moreover, it obviates re-circulation (or waste) of water, with the attendant expensive arrangements for recooling and pumping, and enables the heat hitherto imparted to this water and wasted, on account of the low temperature and unclean condition of the water, to be applied to the generation of steam.

A very important advantage of my new way of treating the newly made gas is found in the fact that I may recover the heat of the gas without using more or essentially different apparatus than has heretofore been used. Heretofore a gas condenser and a hydraulic seal or equivalent valve have both been required. On account of the high temperature which is given to the condensing water, I not only effectively utilize the condensing water as well as the waste heat for the generation of steam, instead of as heretofore producing a large amount of water below 212° F., in excess of what can be economically utilized, but I also correspondingly reduce the quantity of water required to clean and cool the gas, owing to the fact that the great amount of sensible heat absorbed and rendered latent in the conversion of the condensing water into steam correspondingly increases the cool-efficiency of the water.

To jointly utilize the heat contained in the newly made gas and in the blast products, I provide a separate steam generator or boiler which I heat by the blast products and connect this boiler with the gas condensing apparatus or steam generating section of that apparatus, so that the blast products boiler is fed with hot water from the gas condensing apparatus and preferably so that the blast products and steam generating section of the gas condenser may steam in common.

Heretofore many plans have been proposed for utilizing the sensible heat contained in the blast products and in the newly made gas after issuance from the gas generating apparatus proper, but none of these plans has proved satisfactory in practice. In particular, it has been heretofore attempted to recover the sensible heat contained in the newly made gas and in the blast products by passing the blast products and the uncleaned newly made gas through a single steam boiler, but in practice, it has been found that there are almost prohibitive objections to this mode of operation, due, in the first place, to the rapid fouling of the boiler flues with deposits only removable at the cost of great time and labor, wear and tear, and personal risk, and, in the second place, to the vitiation of the neighborhood by the tarry vapors, smoke and fumes deposited from the newly made gas and subsequently swept out by the blast products—not to speak of the waste thus entailed.

With the usual steam pressure of 100 lbs. or more, the temperature of the flues of the steam boiler will equal or exceed 340° Fahrenheit, and in this connection it is common knowledge that even in simple steam boiler practice (where the flues are clean and effective) the combustion products issue therefrom at a temperature seldom below 600° Fahrenheit. Now, inasmuch as the maximum temperature of the blast products or of the newly made gas is normally about 1500° Fahrenheit, it is evident that the maximum probability of a joint steam boiler for the two gases is the absorption of 60 per cent. of the sensible heat of these gases. This maximum of say 60 per cent. is, however, soon largely reduced by the fouling of the boiler tubes due to the passage of these gases. This loss takes place at an incremental rate of increase, owing to the fact that the non-conducting deposit bakes upon the sides of the flues in ever increasing thickness, which not only increasingly prevents the direct transference of heat, but also correspondingly decreases the area for the passage of both the gas and the blast products and thereby causes them (in decreasing volume, or at increasing blast pressure) to rush through the boiler at an increasingly uneconomical rate of speed. Moreover, this increasing back-pressure from the fouling of the boiler flues may quickly lead to greater expenditure for generator fuel (which is much more expensive than boiler fuel) than the total value of the heat thus saved from the gas, for back-pressure against the blast interferes with the maintenance of the economical rate of blasting through the generator fuel-bed. Furthermore, the alternate use of the steam boiler for the blast-products during the period of blasting and for the newly made gas during the succeeding period of gas making, makes a separate and independent steam boiler necessary for each section of water gas apparatus; whereas, the same steam boiler will serve equally as well and even better for two (or more) sections of water gas apparatus, if used only for the blast products. No increase is necessary in the size of the steam boiler serving two sections, for the "blows" (which are shorter than the "runs") alternate without overlapping, and two sections of water gas apparatus blowing through the same boiler give a much more constant and efficient heating effect than a single section.

By using a single steam boiler exclusively and almost continuously for the blast products from two or more sections of gas generating apparatus, instead of alternately for the blast-products and the gas from a single section, I also attain conditions which enable the air-blast to be safely and simply pre-heated. Previous attempts in this direction have failed owing largely to difficulties with the higher temperatures; but, in my system, with the stack gases leaving the steam boiler almost continuously at the reduced temperature of say 600° Fahrenheit, a further large proportion of their heat can be easily transferred to the air-blast entering the water-gas apparatus, and thus saved and utilized in the place of expensive generator fuel, without attendant difficulty of any kind.

With the above detailed explanation, the method which I have devised for recovering the waste heat of both the escaping blast products and the newly made gas will now be readily understood by reference to the accompanying drawings of which—

Figure 1 is a diagrammatic elevation partly broken away and in section of one form of apparatus which I may employ, and Fig. 2 is an elevation partly broken away and in section taken at right angles to Fig. 1.

The blast-products issuing from the oil-fixing chamber or "superheater" A, in the manufacture of carbureted water gas, I pass through a steam boiler B, which has sufficient aggregate cross section of flues to prevent any back pressure that would interfere practically with the most economical rate of blasting the generator fuel bed, said boiler flues having sufficient length, and therefore sufficient heating surface, to reduce the escaping blast products to the economical temperature, prior to their entering the optional blast heater C, if employed. During the run or period of gas making, this steam boiler (and blast heater) is entirely cut off from the fixing chamber or "superheater" A by the blast products valve D placed between the steam boiler and the said fixing chamber. Preferably this "blast products" valve should be of a design that permits any possible leakage to vent freely into the atmosphere and not pass forward into the steam boiler. The stack valve (and safety vent) E by-passes the steam boiler B. A dust trap is shown at F. A small valve-controlled air supply G is preferably provided in front of the steam boiler so that any CO which may be present in the blast products entering the steam boiler may be consumed and its heat developed into steam. The newly made gas I pass first through the hydraulic seal H. The gast is discharged in the washer seal H from the pipe $H^1$ against the liquid baffle formed by the body of water $H^2$ and this body of water collects a large proportion of the carbonaceous impurities from the gas as mentioned above and thus eliminates subsequent difficulty from deposits. $H^3$ represents the overflow pipe for the tarry fluid into which the carbonaceous impurities settle at the bottom of the washer seal. $H^4$ represents the automatic inlet valve controlling the supply of water to the washer seal. I next pass the gas through a primary or preliminary boiler or condenser J, which works at boiler pressure and steams in common with the main steam boiler B heated by the blast products; and then through the normal low pressure gas condenser (or condensers) K which serves as a feed water heater, whence the effluent water from the hot-well L is pumped by the pump M into the primary boiler or condenser J.

I have thus a compound boiler, composed of two sections; one section being a steam boiler heated by the blast products, and the other section being the apparatus used in cooling the gas to the desired normal temperature. These two sections steam in common, but the blast products boiler is fed by water overflowing from the gas heated section. As shown, the steam generated in the primary boiler or condenser J has free access through the pipes N to the steam space of the blast products steam boiler B, and the surplus water overflows automatically by the pipes O from the primary boiler J into the said blast products steam boiler B. Now assuming the proper temperature to be attained throughout the gas generating vessels, the blast is shut off, the blast products valve D between the superheater A and the steam boiler B is closed (preferably after the apparatus has been purged by steam gas), and the generation of gas is begun. The pressure instantly rises in the apparatus until the gas begins to pass through the hydraulic washer seal H. It then passes immediately through the primary boiler or condenser J, which works at the same pressure as the blast products steam boiler B, and is coupled thereto by the pipes N so that they steam in common, while the surplus water overflowing from the primary boiler J through the pipes O feeds the said steam boiler B. In the design of this primary boiler J, I take advantage of the counter-current principle, the water and the heating gas flowing in opposite directions. As shown, the heated water rises naturally from its inlet at the bottom, by gravity, as well as by the confined course of its current, whereas the gas travels downward in reverse direction. It is obvious, therefore, that if the primary boiler be of proper cross section and sufficiently long the gas can be made to leave the bottom at practically the temperature of the entering water, provided the steam be drawn away from the top as fast as it is generated. A condenser of such a size working at say 100 lbs. pressure would, however, entail unnecessary expense; so, in practice, I use preferably the small primary boiler J, so proportioned that it reduces the gas to a temperature which prevents any steam being generated in the adjacent low pressure condenser K when the water passing through this condenser is regulated to reduce the outlet gas to its normal temperature. I place my boiler feed pump M between the primary boiler J and the said low pressure condenser K. I, therefore, have the gas issuing from the final condenser at normal temperature; the cold boiler feed water entering said condenser at approximately the same point; the boiler feed pump drawing from the automatic hot-well on the top of the condenser, and delivering this effluent hot condenser water into the primary boiler or condenser against the regular working steam pressure. This hot water then traverses the whole length of the primary boiler in counter-direction to the flow of the hot gas therein, and the steam thus generated joins with the steam generated in the main steam boiler. That portion of the water fed into the primary boiler which is not converted to steam therein overflows automatically into the water space of the main steam boiler, and is there converted into steam by the waste heat of the blast products; and the stack gases from this main steam boiler optionally pre-heat the air blast. I thus recover and utilize, simply and almost automatically, nearly the whole of the heat contained in the blast products and the newly made gas.

I have shown preferably one steam boiler B (with optional air blast heater C), heated alternately by the blast products from two sections of gas generating apparatus A, either or both of which sections can readily by-pass the steam boiler B by opening the stack valve E (which acts normally as a safety vent) and closing the blast products valve D. On the other hand, I have shown preferably two primary boilers J, jointly coupled to the steam boiler B by the steam pipes N and the water pipes O, each of these primary boilers being heated separately by the gas from one section of generating apparatus. Manifestly, this indicated grouping may be re-arranged at will; but, inasmuch as the blasting periods are usually much shorter than the gas making periods, the "blows" with two sections need never overlap, whereas the "runs" must usually overlap for a considerable time; hence it is convenient to treat the blast products jointly and the gas separately.

For starting up cold plant or where apparatus is used intermittently or under other circumstances, it may be necessary or desirable to have an independently-fired boiler as shown at P to supplement my waste heat system. Under such circumstances I prefer that said independent boiler should be connected with my compound boiler, as indicated by the steam pipe Q and the water pipe R.

The apparatus disclosed herein, while possessing various patentable features novel with me, is not claimed herein but is claimed in my prior application, Serial No. 463,576, filed November 20, 1908, of which the present case is a division.

Having now described my invention, what I claim as new and desire to secure by Letters Patent is:

1. The process of treating hot newly made carbureted water gas to cool it and free it from impurities and at the same time utilize its heat, which consists in freeing the gas of a large quantity of carbonaceous impurities which tend to deposit on or clog up the gas cooling flues by forcing the hot gas without appreciable previous cooling from the temperature of generation into contact with water in such manner, and supplying the cleansing water in such limited amount, that the water collects and removes a large proportion of such impurities and is itself largely converted into steam, while the partially cleaned gas still remains heated to a degree materially in excess of 212° F. and passes from the cleaning chamber in admixture with steam correspondingly superheated; and passing the escaping gas and steam through a gas cooling and water heating system, whereby the gas and steam mixed therewith are cooled and the latter condensed and wherein the heat given off by the gas and steam is utilized in raising the temperature of the cooling water to a point substantially higher than 212° F.

2. The process of treating the hot newly made carbureted water gas to cool it and free it from impurities and at the same time utilize its heat, which consists in freeing the gas of a large quantity of carbonaceous impurities which tend to deposit on or clog up the gas cooling flues, by causing the hot gas without appreciable previous cooling from the temperature of generation to impinge against a water baffle in such manner, and supplying water to said baffle in such limited amount that the water collects and removes a large proportion of such impurities and is itself largely converted into steam, while the partially cleaned gas still remains heated to a degree materially in excess of 212° F. and passes from the cleaning chamber in admixture with steam correspondingly superheated; and passing the escaping gas and steam through a gas cooling and water heating system wherein the gas and steam mixed therewith are cooled and the latter condensed and wherein the heat given off by the gas and steam is utilized in raising the temperature of the cooling water to a point substantially higher than 212° F.

3. In the process of making carbureted water gas that improvement which consists in utilizing the latent and sensible heat of both the tar carrying carbureted water gas and the blast gas for the single purpose of generating steam, by applying said gases at a temperature effective for the generation of steam and separately to different steam generating surfaces, whereby said two gases do not come into contact with the same steam generating surface and the emission of smoky hydrocarbons with the blast gas to the atmosphere and fouling of the steam generating surface, are prevented.

4. The method of efficiently recovering the heat of the blast gas and of the newly made illuminating gas issuing from a carbureted water gas plant, which consists in conveying the newly made carbureted water gas and the blast gas away from the gas generating apparatus through separate paths, each including a boiler passage or passages in such manner that the newly made carbureted water gas and the blast gas are introduced each into different boiler passages without previously cooling either to a temperature below that effective to convert water into steam in passing through the boiler passage or passages in its path, whereby the heat of each gas is utilized in the generation of steam and the emission of smoky hydrocarbons and the fouling of said passages are minimized.

5. The method of efficiently recovering the heat contained in blast gas and of the newly made gas issuing from a carbureted water gas plant, which consists in conveying the blast gas away from the gas generating apparatus through a path including a boiler passage or passages into which this gas is admitted without material reduction in temperature and conveying the newly made gas away from the gas generating apparatus through a separate path also including a boiler passage or passages and purifying the newly made gas before its admission to the boiler passage or passages in its path in a manner tending to lower the temperature below that at which it is effective to convert water into steam as it passes through said boiler passage or passages, whereby the heat of both gases is utilized in the generation of steam and the emission of smoky hydrocarbons and the fouling of said boiler passages are minimized.

6. The method of efficiently recovering the heat of the blast gas and of the newly made gas issuing from a carbureted water gas plant which consists in conveying the two gases away from the gas generating apparatus through separate paths in which each is brought into contact with the walls of the water space or spaces of steam generating apparatus without first cooling either gas to a temperature at which it is ineffective to convert water contained in said space or spaces into steam, whereby the heat of both gases is utilized in the generation of steam and the emission of smoky hydrocarbons and the fouling of the exposed water walls are minimized and the temperature of said walls is kept desirably low by the water in contact therewith.

ARTHUR G. GLASGOW.

Witnesses:
FREDERIC THUMAN,
J. CALDWELL STELP.